United States Patent
Dernoncourt et al.

(10) Patent No.: US 11,983,205 B2
(45) Date of Patent: May 14, 2024

(54) SEMANTIC PHRASAL SIMILARITY

(71) Applicant: ADOBE INC., San Jose, CA (US)

(72) Inventors: Franck Dernoncourt, San Jose, CA (US); Amir Pouran Ben Veyseh, Eugene, OR (US)

(73) Assignee: ADOBE INC., San Jose, CA (US)

(*) Notice: Subject to any disclaimer, the term of this patent is extended or adjusted under 35 U.S.C. 154(b) by 187 days.

(21) Appl. No.: 17/163,953

(22) Filed: Feb. 1, 2021

(65) Prior Publication Data
US 2022/0245179 A1 Aug. 4, 2022

(51) Int. Cl.
| | |
|---|---|
| G06F 16/332 | (2019.01) |
| G06F 16/338 | (2019.01) |
| G06F 18/21 | (2023.01) |
| G06F 40/289 | (2020.01) |
| G06F 40/30 | (2020.01) |
| G06N 20/00 | (2019.01) |

(52) U.S. Cl.
CPC ........ *G06F 16/3329* (2019.01); *G06F 16/338* (2019.01); *G06F 18/2178* (2023.01); *G06F 40/289* (2020.01); *G06F 40/30* (2020.01); *G06N 20/00* (2019.01)

(58) Field of Classification Search
CPC .. G06F 16/3329; G06F 16/338; G06F 40/289; G06F 40/30; G06N 20/00; G06K 9/6263
See application file for complete search history.

(56) References Cited

U.S. PATENT DOCUMENTS

| | | | | |
|---|---|---|---|---|
| 10,394,826 | B1* | 8/2019 | Viswanathan | G06F 16/245 |
| 10,437,833 | B1* | 10/2019 | Nguyen | G06F 40/284 |
| 2016/0042296 | A1* | 2/2016 | Shan | G06N 5/022 |
| | | | | 706/11 |
| 2018/0189385 | A1* | 7/2018 | Sun | G06F 16/243 |
| 2018/0329881 | A1* | 11/2018 | Bennett | G06F 40/20 |
| 2019/0065576 | A1* | 2/2019 | Peng | G06F 16/22 |
| 2020/0057762 | A1* | 2/2020 | Okajima | G06F 16/24522 |
| 2020/0342055 | A1* | 10/2020 | Patra | G06N 3/048 |
| 2021/0042469 | A1* | 2/2021 | Saito | G06F 40/20 |
| 2021/0081462 | A1* | 3/2021 | Lu | G06F 16/90339 |
| 2021/0216577 | A1* | 7/2021 | Xiao | G06F 16/3329 |
| 2022/0129629 | A1* | 4/2022 | Niu | G06K 9/6215 |

(Continued)

OTHER PUBLICATIONS

1Devlin, et al., "BERT: Pre-training of Deep Bidirectional Transformers for Language Understanding", arXiv preprint arXiv:1810.04805 (2019), 16 pages.

(Continued)

*Primary Examiner* — Michael N Opsasnick
(74) *Attorney, Agent, or Firm* — F. CHAU & ASSOCIATES, LLC

(57) ABSTRACT

Systems and methods for similarity search are described. Embodiments identify a document and a query corresponding to a matching phrase in the document, encode the query and a candidate phrase, score the candidate phrase using at least one learning-based score and at least one surface form score, wherein the at least one learning based score is based on the encoding, and the at least one surface form score is based on a surface form of the query and a surface form of the candidate phrase, and select the matching phrase based on the scoring.

20 Claims, 7 Drawing Sheets

(56) References Cited

U.S. PATENT DOCUMENTS

2022/0180060 A1* 6/2022 Jain ...................... G06F 40/205

OTHER PUBLICATIONS

2Lavie, et al., "Meteor: An Automatic Metric for MT Evaluation with High Levels of Correlation with Human Judgments", In Proceedings of the second workshop on statistical machine translation, pp. 228-231 (2007).
3Bojanowski, et al., "Enriching Word Vectors with Subword Information", arXiv preprint arXiv:1607.04606 (2016), 12 pages.
4Pagliardini, et al., "Unsupervised Learning of Sentence Embeddings using Compositional n-Gram Features", In Proceedings of the 2018 Conference of the North American Chapter of the Association for Computational Linguistics: Human Language Technologies, vol. 1 (Long Papers), pp. 528-540 (Association for Computational Linguistics, New Orleans, Louisiana, 2018). DOI 10.18653/v1/N18-1049.
5Zhang, et al., "Bertscore: Evaluating Text Generation With Bert", arXiv preprint arXiv:1904.09675 (2020), 43 pages.

\* cited by examiner

SEMANTIC PHRASAL SIMILARITY

BACKGROUND

The following relates generally to similarity search, and more specifically to similarity search using machine learning.

In the field of information retrieval, similarity search refers to the task of extracting semantically similar phrases based on a query. In some cases, phrasal similarity search includes identifying relevant candidate phrases from a document and comparing the candidate phrases to the query. For example, a user may input a query via a user interface, and a search engine may find relevant phrases that are similar or relevant to the query.

In some cases, similarity search systems represent query and candidate phrases as vectors in an embedding space. The vector representation may capture the semantic meaning of the query and the candidate phrases. An information retrieval system such as a search engine can retrieve relevant or matching phrases by comparing the embedded representation of the query to the embedded representations of the candidate phrases. Recently, information retrieval systems have used neural networks and other sophisticated embedding systems to generate word embeddings.

However, conventional similarity search systems do not take into account structural similarities that would be obvious to a human observer. For example, the systems may not recognize when a phrase is exactly the same as another phrase, or when it has a similar number of words as another phrase. Therefore, there is a need in the art for improved similarity search systems that can recognize structural similarities.

SUMMARY

The present disclosure describes systems and methods for similarity search. Embodiments of the disclosure provide a phrasal similarity apparatus that uses a machine learning model to score each of a set of candidate phrases. The machine learning model is trained to recognize both semantic and structural similarity. In some embodiments, a supervised learning network is used to select a matching phrase having the highest similarity to a query based on a scoring model that incorporates both semantic and structural similarity.

A method, apparatus, and non-transitory computer readable medium for similarity search are described. Embodiments of the method, apparatus, and non-transitory computer readable medium are configured to identify a document and a query corresponding to a matching phrase in the document, encode the query and a candidate phrase, score the candidate phrase using at least one learning-based score and at least one surface form score, wherein the at least one learning based score is based on the encoding, and the at least one surface form score is based on a surface form of the query and a surface form of the candidate phrase, and select the matching phrase based on the scoring.

An apparatus and method for similarity search are described. Embodiments of the apparatus and method include an encoder configured to encode a query and a candidate phrase from a document and a scoring component configured to score the candidate phrase using at least one learning-based score and at least one surface form score, wherein the at least one learning based score is based on the encoding, and the at least one surface form score is based on a surface form of the query and a surface form of the candidate phrase.

A method, apparatus, and non-transitory computer readable medium for training a phrasal similarity network are described. Embodiments of the method, apparatus, and non-transitory computer readable medium are configured to identify a document, a query, a ground truth matching phrase, and a plurality of candidate phrases from the document, encode the query and the plurality of candidate phrases using an encoder, score the candidate phrases using at least one learning-based score and at least one surface form score, wherein the at least one learning based score is based on the encoding, and the at least one surface form score is based on a surface form of the query and a surface form of a candidate phrase of the plurality of candidate phrases, compute a loss function based on the ground truth matching phrase and an output of a scoring component, and update parameters of the encoder based on the loss function.

DETAILED DESCRIPTION

Figure 1:
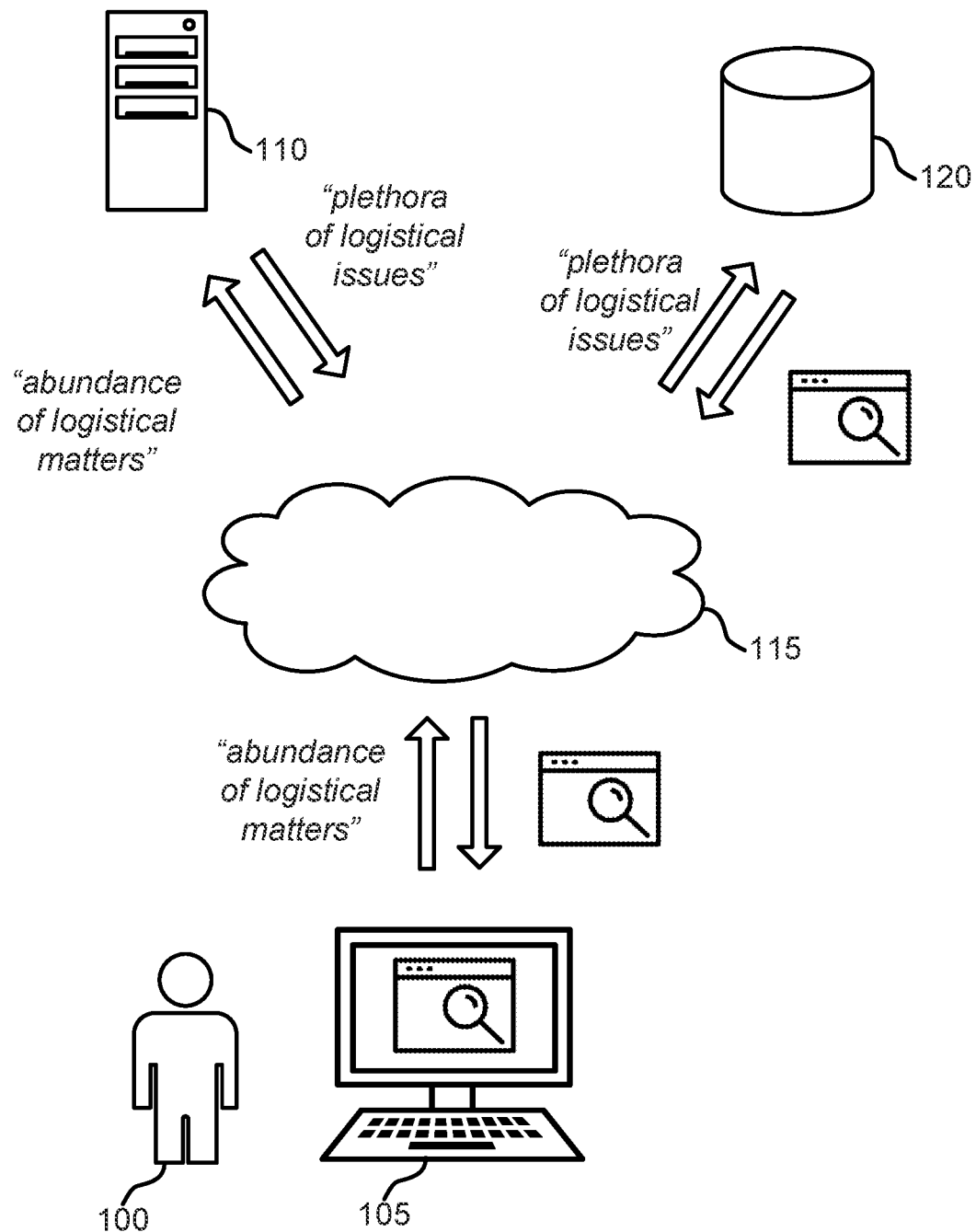
FIG. 1 shows an example of a system for similarity search according to aspects of the present disclosure.

The present disclosure describes systems and methods for similarity search. In some embodiments, a supervised learning network is used to select a matching phrase based on a query and a document. The scoring model incorporates both semantic and structural similarity. In one embodiment, a phrasal similarity apparatus may be configured to score each of a set of candidate phrases and select the matching phrase based on the scoring.

Similarity search models may incorporate an embedding-based model that captures the semantic meaning of phrases. These models represent a query and a candidate phrase using the embeddings obtained from pre-trained language models such as a Bidirectional Encoder Representations from Transformers (BERT) model. A similarity score may be computed using the encoded representation of each candidate phrase (e.g., the cosine similarity between the query and the phrase representations). The candidate with the highest score may then be selected as the matching result.

However, conventional similarity search systems do not take into account structural similarities that would be obvious to a human observer. For example, conventional similarity search models are not able to capture a correlation between the number of words in the query and the ground-truth phrase. Furthermore, these search models do not include trainable parameters. Since the pre-trained language models are fixed in terms of parameters and weights, conventional systems do not incorporate supervision signals to increase their performance.

Embodiments of the present disclosure provide an improved phrasal similarity apparatus. A phrasal similarity system described herein utilizes a supervised, feature-enhanced learning method for scoring candidate phrases. According to an embodiment, the improved phrasal similarity apparatus extracts a set of candidate phrases from a given document. The phrasal similarity apparatus selects a candidate with the highest similarity as the given query using a supervised classification approach. The similarity score incorporates both semantic and structural similarity. As a result, apparatus and methods of the present disclosure increase the quality of the search results by providing the most similar match to the given query based on its meaning.

Embodiments of the present disclosure may be used in the context of phrasal similarity or synonym search. For example, enhanced search experience can be applied to digital content products such as Adobe® Experience Manager (AEM), Document Cloud and Creative Cloud tutorials. Phrasal similarity search is also applicable to interactions between a user and a knowledge base. A knowledge base refers to a process of extracting structured information from a vast amount of unstructured or unusable data, and feeding the structured information to downstream applications for search, question-answering, link prediction, visualization, modeling, and etc.

Knowledge base construction is challenging as it involves dealing with complex input data and tasks such as parsing, extracting, cleaning, linking, and integration. Using machine learning techniques, these tasks typically depend on feature engineering (i.e., manually crafting attributes of the input data to feed into a system). In some cases, deep learning models can operate directly over raw input data such as text or images, and enable connections between a set of entities, and a user can interpret those connections after a knowledge accumulation phase and make inferences based on prior knowledge.

An example phrasal similarity apparatus based on the present disclosure may take a query and a document including a set of candidate phrases, and efficiently select a matching phrase semantically similar to the query. An example of an application of the inventive concept in the search context is provided with reference to FIGS. 1 and 2. Details regarding the architecture of an example phrasal similarity apparatus are provided with reference to FIGS. 3, and 4. An example of a process for similarity search is provided with reference to FIGS. 5 and 6. A description of an example training process for a phrasal similarity network is described with reference to FIG. 7.

Phrasal Similarity Search

FIG. 1 shows an example of a system for similarity search according to aspects of the present disclosure. The example shown includes user 100, user device 105, phrasal similarity apparatus 110, cloud 115, and database 120. The phrasal similarity apparatus 110 is an example of, or includes aspects of, the corresponding element described with reference to FIGS. 3 and 4.

In an example of FIG. 1, a database 120 stores documents, each of which typically (although not necessarily) includes multiple sentences. The user 100 communicates with the phrasal similarity apparatus 110 via the user device 105 and the cloud 115, e.g., by sending a search query. According to an example, the search query is "abundance of logistical matters". The phrasal similarity apparatus 110 receives a search query from the user 100.

The phrasal similarity apparatus 110 identifies documents stored in the database 120. The phrasal similarity apparatus 110 then encodes the search query and candidate phrases from the documents. A scoring component of the phrasal similarity apparatus 110 scores each candidate phrase using at least one learning-based score and at least one surface form score, where the at least one learning based score is based on the encoding, and the at least one surface form score is based on surface forms of the query and the candidate phrase. Thus, in one example, a document includes the term "plethora of logistical issues", which is matched to the query, "abundance of logistical matters".

The phrasal similarity apparatus 110 then selects the matching phrase from a document based on the scoring. In the example above, the matching phrase is "plethora of logistical issues". In one example, the matching phrase is passed to the database 120 and search results are generated by an external search engine based on the matching phrase. In some cases, searching based on a matching phrase may be used to provide different or more abundant search results based on the original query.

The user 100 views search results on a user device 105. The user device 105 may be a personal computer, laptop computer, mainframe computer, palmtop computer, personal assistant, mobile device, or any other suitable processing apparatus. In some examples, the user device 105 includes an internet browser interface where the user can input a search query on the browser interface. In some cases, the user view search results generated from an external search engine via the internet browser interface.

The phrasal similarity apparatus 110 may include a supervised network model for noun phrase synonym extraction from a document. The network model is also referred to as a phrasal similarity network. The phrasal similarity network increases the performance by utilizing the existing training data for this task. Additionally, the phrasal similarity network includes features that are computed from either a surface form of the phrases and the query or their embeddings.

According to some embodiments of the present disclosure, the phrasal similarity apparatus 110 includes a computer implemented artificial neural network (ANN) that produces a matching phrase in a document with the highest semantic similarity as a search query provided by a user. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to an embodiment, given a document and a query, the phrasal similarity apparatus 110 identifies and returns a phrase in the document that has the highest semantic similarity with the given query phrase. In some examples, the query includes exclusively noun phrases.

According to an embodiment, the phrasal similarity apparatus 110 applies a supervised learning approach. An encoder of the phrasal similarity network includes trainable parameters (e.g., weights associated with a surface form score, multiple trainable parameters for weighting a score for a candidate phrase). In an embodiment, the phrasal similarity apparatus 110 includes a classification network which is configured to output whether a candidate phrase is a good match for a given query.

In some cases, the phrasal similarity apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

According to some embodiments, database 120 stores documents and identifies information from the documents based on a query or a matching phrase. A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user 100 interacts with database controller. In other cases, database controller may operate automatically without user interaction.

Figure 2:
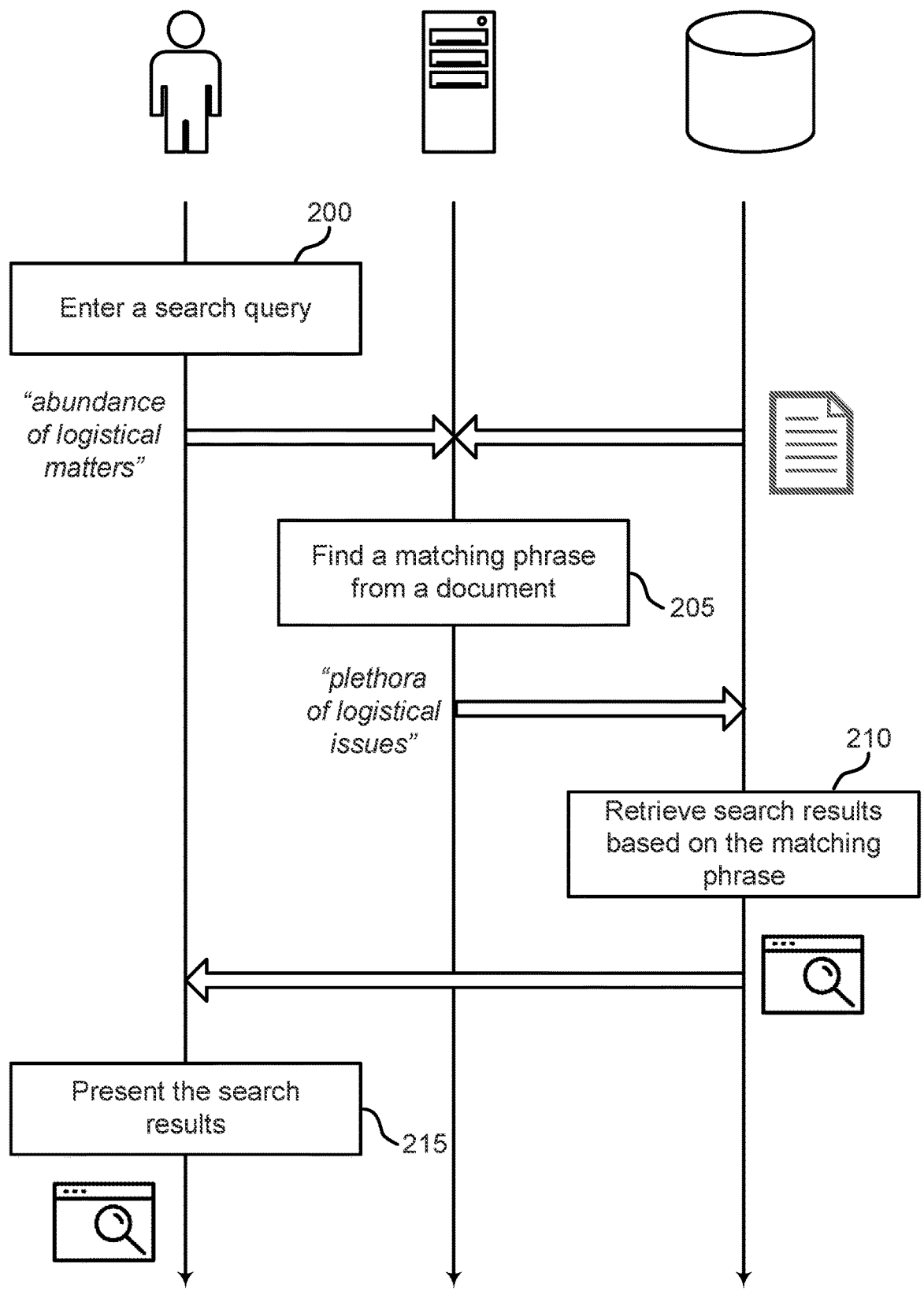
FIG. 2 shows an example of a process for similarity search according to aspects of the present disclosure.

FIG. 2 shows an example of a process for similarity search according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user enters a search query. The search query includes one or more phrases. In some examples, a search query includes noun phrases. As an example shown in FIG. 2, the query is "abundance of logistical matters" and the user enters the query on an internet browser interface of a user device. In some cases, the user enters a query through a user interface of the system. In some cases, the operations of this step refer to, or may be performed by, a user interface as described with reference to FIG. 3.

At operation 205, the system finds a matching phrase from a document. In some cases, the operations of this step refer to, or may be performed by, a phrasal similarity apparatus as described with reference to FIG. 1.

According to the example above, the query "abundance of logistical matters" is input to a phrasal similarity network of the system. The phrasal similarity network also identifies a document from a database (i.e., the document is represented by a document icon with an arrow pointing from the database to the system). The document includes multiple sentences. Additionally, the document includes a set of candidate phrases. In an example, the document may read " . . . Our Downtown School of Public Affairs Planning Task Force and its Executive Work Group and 6 subcommittees have been working hard the past few months on planning for the launch. Currently, we are working on a strategic plan for the downtown school and addressing the plethora of logistical issues that come with starting up a new facility . . . ."

The phrasal similarity network extracts the set of candidate phrases and selects a candidate phrase with the highest similarity with the query. According to the example above, the system selects "plethora of logistical issues" in the sentence "we are working on a strategic plan for the downtown school and addressing the plethora of logistical issues that come with starting up a new facility" as the matching phrase.

At operation 210, the system retrieves search results based on the matching phrase. According to the example above, the matching phrase "plethora of logistical issues" is input to an external search engine to generate search results based on the matching phrase. The search results are stored in the database. The system retrieves the search results and passes the search results to a user device through a cloud. In some cases, the operations of this step refer to, or may be performed by, a search component as described with reference to FIG. 3.

At operation 215, the system presents the search results. In some examples, the search results are stored in a database and presented to the user through the user device. The user views the search results (e.g., on an internet browser interface of the user device) and can make further actions on the search results. For example, the user may choose to enter a different query. The user may refine the original query to narrow down or expand the search results. In some cases, the operations of this step refer to, or may be performed by, a user interface as described with reference to FIG. 3.

Network Architecture

Figure 3:
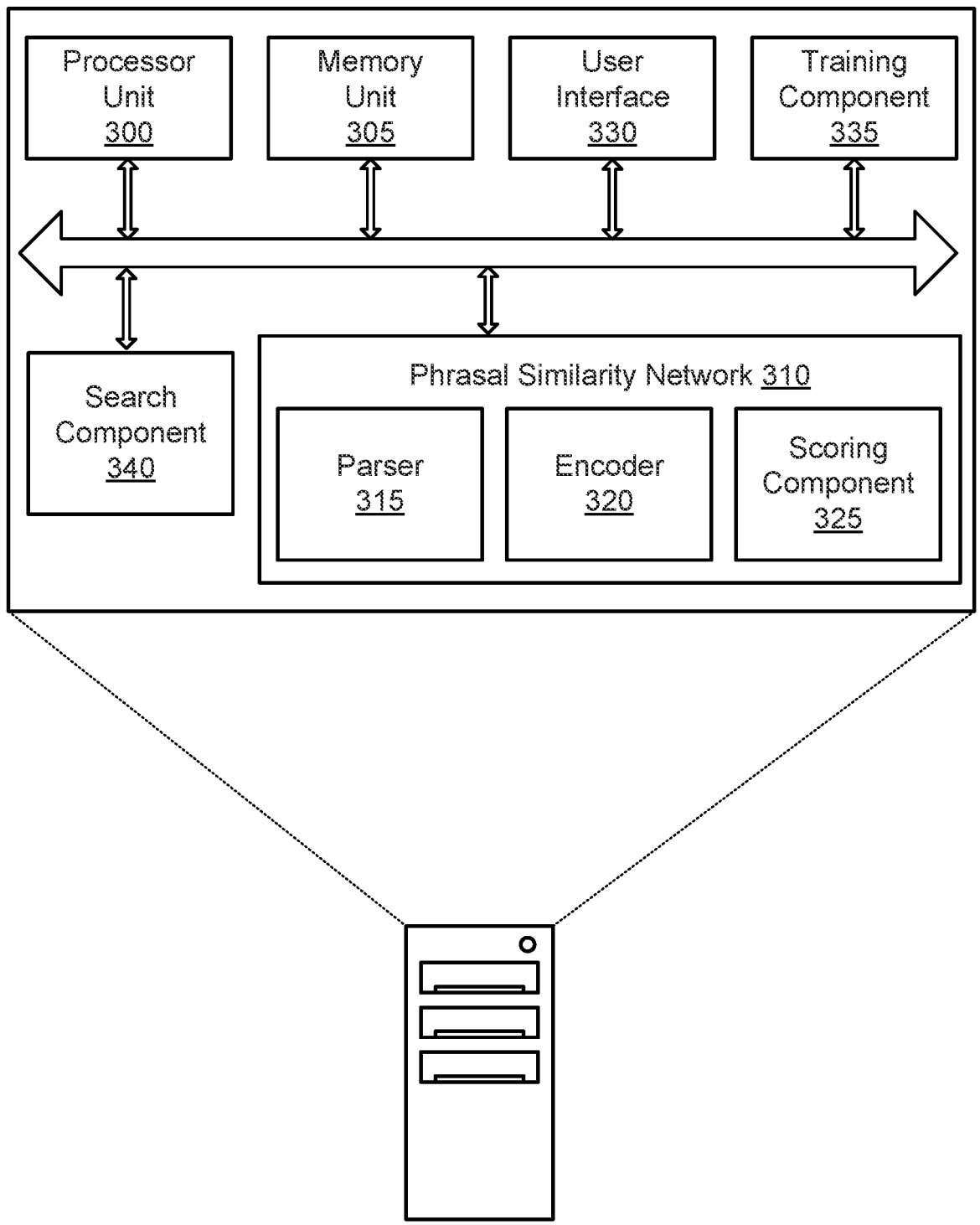
FIG. 3 shows an example of a phrasal similarity apparatus according to aspects of the present disclosure.

FIG. 3 shows an example of a phrasal similarity apparatus according to aspects of the present disclosure. The example shown includes processor unit 300, memory unit 305, phrasal similarity network 310, user interface 330, training component 335, and search component 340.

In one embodiment, phrasal similarity network 310 includes parser 315, encoder 320, and scoring component 325. According to this embodiment, encoder 320 is configured to encode a query and a candidate phrase from a document and scoring component 325 is configured to score the candidate phrase using at least one learning-based score and at least one surface form score, wherein the at least one learning based score is based on the encoding, and the at least one surface form score is based on a surface form of the query and a surface form of the candidate phrase.

A processor unit 300 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor unit 300. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, a memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

According to some embodiments, phrasal similarity network 310 selects the matching phrase based on the scoring. In some examples, phrasal similarity network 310 determines that the candidate phrase has a highest score among the candidate phrases, where the candidate phrase is selected as the matching phrase based on the determination.

According to some embodiments, parser 315 identifies a document and a query corresponding to a matching phrase in the document. In some examples, parser 315 identifies a set of candidate phrases from the document. In some examples, the query and the set of candidate phrases are noun phrases. Parser 315 is an example of, or includes aspects of, the corresponding element described with reference to FIGS. 4 and 6.

According to some embodiments, encoder 320 encodes the query and a candidate phrase. The encoder 320 encodes the query and the candidate phrase together to produce a pair representation. In some examples, encoder 320 encodes the query and the candidate phrase together to produce a pair representation. In some other examples, encoder 320 encodes the query and the candidate phrase separately to produce a query representation and a candidate representation.

According to some embodiments, encoder 320 is configured to encode a query and a candidate phrase from a document. The encoder 320 includes a supervised machine learning model that is trainable based on an output of the scoring component 325. In some examples, the encoder 320 includes a Bidirectional Encoder Representations from Transformers (BERT) model. In an embodiment, the encoder 320 can be used as a classifier by adding a feed forward layer.

According to some embodiments, encoder 320 encodes the query and the set of candidate phrases. Encoder 320 is an example of, or includes aspects of, the corresponding element described with reference to FIGS. 4 and 6.

According to some embodiments, scoring component 325 scores the candidate phrase using at least one learning-based score and at least one surface form score, where the at least one learning based score is based on the encoding, and the at least one surface form score is based on a surface form of the query and a surface form of the candidate phrase. In some examples, scoring component 325 decodes the pair representation to produce a pair score, where the at least one learning-based score includes the pair score. In some examples, scoring component 325 computes a compatibility score based on the pair representation, the query representation, and the candidate representation, where the at least one learning-based score includes the compatibility score.

In some examples, scoring component 325 computes a first product of the query representation and the pair representation. The scoring component 325 then computes a second product of the candidate representation and the pair representation. The scoring component 325 then sums the first product and the second product to produce the compatibility score.

In some examples, scoring component 325 determines a number of matching words the query has in common with the candidate phrase. The scoring component 325 computes a word match score based on the number of matching words, where the at least one surface form score includes the word match score. In some examples, the scoring component 325 determines a minimum number of words in the query and the candidate phrase. The scoring component 325 divides the number of matching words by the minimum number to produce the word match score.

In some examples, the scoring component 325 determines a number of words in the query. The scoring component 325 determines a number of words in the candidate phrase. The scoring component 325 then computes a word count score based on a difference between the number of words in the query and the number of words in the candidate phrase, where the at least one surface form score includes the word count score. In some examples, scoring component 325 computes a harmonic similarity score based on a harmonic mean of a precision and a recall between fixed semantic representations of the query and the candidate phrase, where the scoring is further based on the harmonic similarity score. In some examples, scoring component 325 computes a cosine similarity score based on a cosine similarity between fixed semantic representations of the query and the candidate phrase, where the scoring is further based on the cosine similarity score. In some other examples, the at least one learning-based score represents semantic similarity between the query and the candidate phrase, and the at least one surface form score does not represent semantic similarity between the query and the candidate phrase. The scoring component 325 scores each of the candidate phrases.

According to some embodiments, scoring component 325 is configured to score the candidate phrase using at least one learning-based score and at least one surface form score, wherein the at least one learning based score is based on the encoding, and the at least one surface form score is based on a surface form of the query and a surface form of the candidate phrase.

According to some embodiments, scoring component 325 scores the candidate phrases using at least one learning-based score and at least one surface form score, where the at least one learning based score is based on the encoding, and the at least one surface form score is based on a surface form of the query and a surface form of a candidate phrase of the set of candidate phrases. Scoring component 325 is an example of, or includes aspects of, the corresponding element described with reference to FIGS. 4 and 6.

According to some embodiments, user interface 330 receives the query from a user. In some examples, user interface 330 responds to the query using the identified information. The user interface 330 presents a response to the user based on an output of the scoring component 325.

According to some embodiments, training component 335 identifies a relationship between the query and the candidate phrase based on the selecting (i.e., selecting the matching phrase using a phrasal similarity network). The training component 335 updates a knowledge based on the relationship.

According to some embodiments, training component 335 identifies a document, a query, a ground truth matching phrase, and a set of candidate phrases from the document. The training component 335 computes a loss function based on the ground truth matching phrase and an output of a scoring component 325. The training component 335 updates parameters of the encoder 320 based on the loss function. In some examples, the output of the scoring component 325 includes a probability distribution for the set of candidate phrases, and the loss function includes a negative log likelihood of a component of the probability distribution corresponding to the ground truth matching phrase.

According to example embodiments, a method of providing an apparatus for similarity search includes providing an encoder configured to encode a query and a candidate phrase from a document and a scoring component configured to score the candidate phrase using at least one learning-based score and at least one surface form score, wherein the at least one learning based score is based on the encoding, and the at least one surface form score is based on a surface form of the query and a surface form of the candidate phrase.

Some examples of the apparatus and method described above further include a parser configured to identify a plurality of candidate phrases from the document. Some examples of the apparatus and method described above further include a user interface configured to receive the query from a user and present a response to the user based on an output of the scoring component.

In some examples, the encoder 320 comprises a supervised machine learning model that is trainable based on an output of the scoring component 325. According to an embodiment, the encoder is based on a bidirectional encoder representations from transformers (BERT) architecture. In some examples, BERT is used as a language representation model, and is configured to pretrain deep bidirectional representations from unlabeled text by jointly conditioning on both left and right context in all layers. As a result, the pre-trained BERT model can be finetuned with an additional output layer to create network models for specific tasks (e.g., question answering and language inference).

In some examples, BERT uses a masked language model (MLM or Masked LM) pre-training objective to alleviate the unidirectionality constraint. The masked language model randomly masks some of the tokens from the input, and the language model is used to predict the original vocabulary id of the masked word based only on its context. Unlike left-to-right language model pre-training, the MLM objective enables the representation to fuse the left and the right context, which pretrains a deep bidirectional transformer. In addition to the masked language model, BERT includes a next sentence prediction (NSP) task that jointly pretrains text-pair representations.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 4:
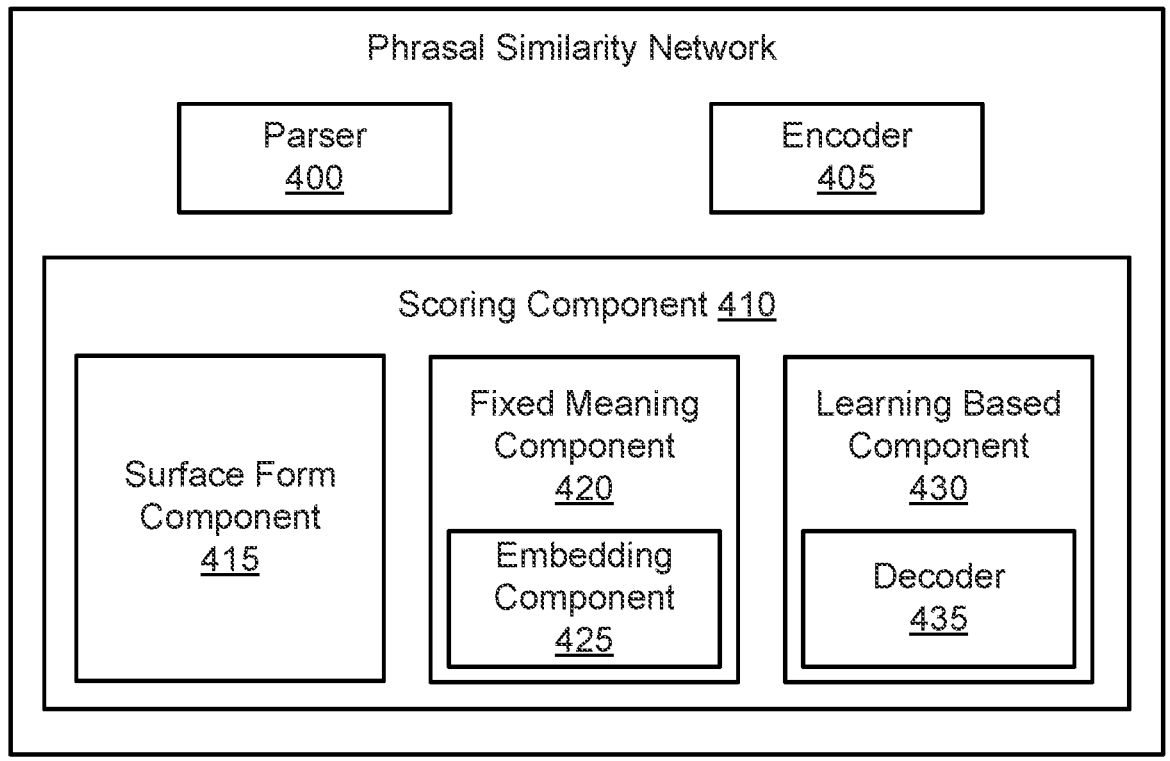
FIG. 4 shows an example of a phrasal similarity network according to aspects of the present disclosure.

FIG. 4 shows an example of a phrasal similarity network according to aspects of the present disclosure. The example shown includes parser 400, encoder 405, and scoring component 410.

In an embodiment, the phrasal similarity network identifies a document. Parser 400 is used to extract all noun chunks (e.g., a set of candidate phrases) from the document. Parser 400 is an example of, or includes aspects of, the corresponding element described with reference to FIGS. 3 and 6.

According to an embodiment, an encoder 405 is used to encode input query and each of the set of candidate phrases into respective vector representation. In some examples, the encoder 405 includes a transformer-based BERT model. The encoder 405 is also referred to as an input encoder. Encoder 405 is an example of, or includes aspects of, the corresponding element described with reference to FIGS. 3 and 6.

Scoring component 410 is an example of, or includes aspects of, the corresponding element described with reference to FIGS. 3 and 6. In one embodiment, scoring component 410 includes surface form component 415, fixed meaning component 420, and learning based component 430.

Surface form component 415 is configured to compute surface form scores including an exact match type score and a word count type score. Surface form component 415 is an example of, or includes aspects of, the corresponding element described with reference to FIG. 6. Details regarding the surface form component 415 is described below with reference to FIG. 6.

In one embodiment, fixed meaning component 420 includes an embedding component 425. The fixed meaning component 420 is configured to calculate a fixed meaning score. In some examples, the fixed meaning score include METEOR, fastText, and Sent2Vec type score/metric. Fixed meaning component 420 is an example of, or includes aspects of, the corresponding element described with reference to FIG. 6. Details regarding the fixed meaning component 420 is described below with reference to FIG. 6.

A learning based component 430 is configured to calculate a leaning-based score. In an embodiment, the learning based component 430 is configured to produce a pair score and a compatibility score. The learning based component 430 includes a decoder 435, which decodes a pair representation to produce the pair score. At least one learning-based score includes the pair score. Learning based component 430 is an example of, or includes aspects of, the corresponding element described with reference to FIG. 6. Details regarding the learning based component 430 is described below with reference to FIG. 6.

Figure 5:
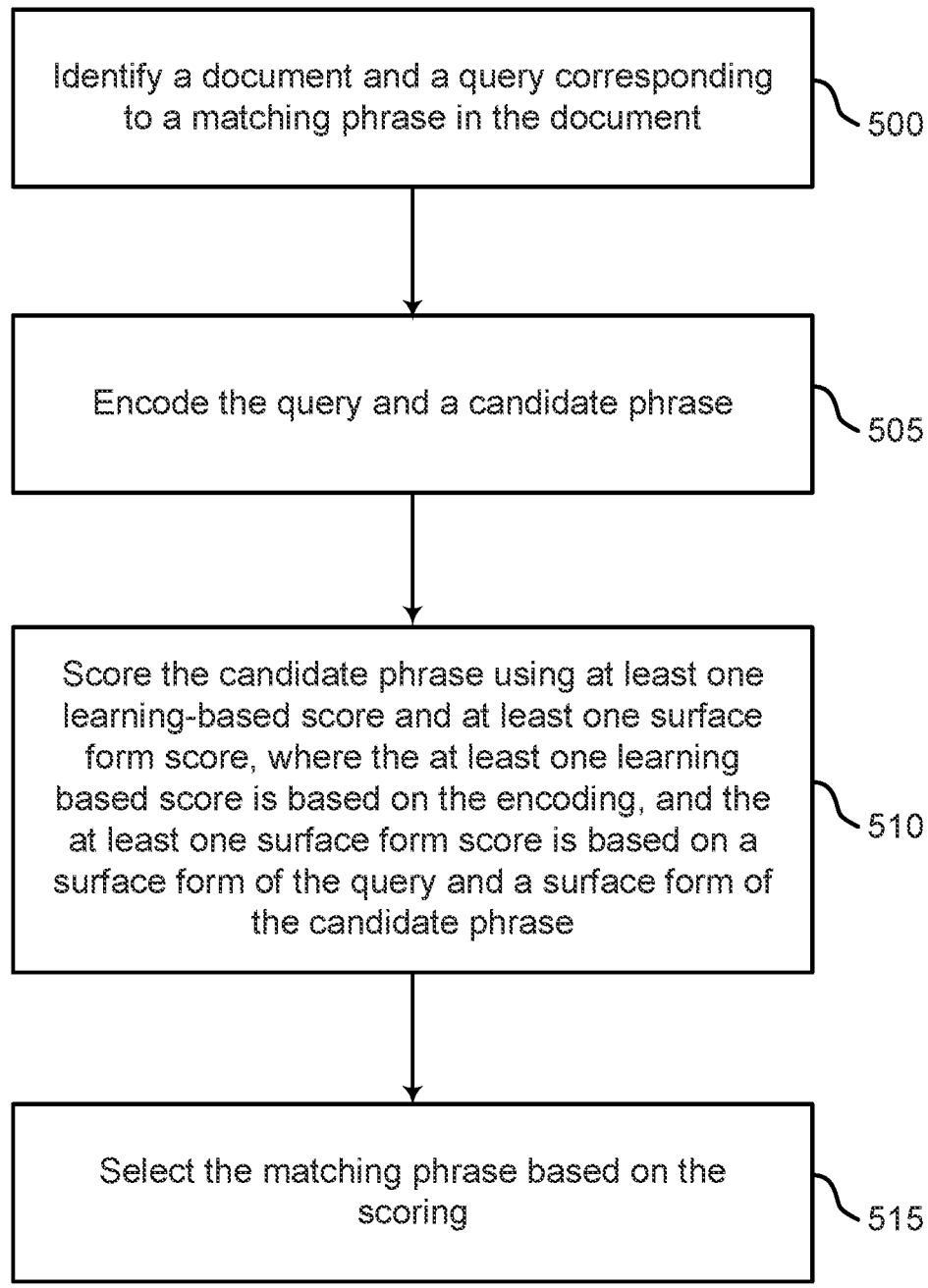
FIGS. 5 and 6 show examples of a phrasal similarity search process according to aspects of the present disclosure.

FIG. 5 shows an example of a phrasal similarity search process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for similarity search is described. Embodiments of the method are configured to identify a document and a query corresponding to a matching phrase in the document, encode the query and a candidate phrase, score the candidate phrase using at least one learning-based score and at least one surface form score, wherein the at least one learning based score is based on the encoding, and the at least one surface form score is based on a surface form of the query and a surface form of the candidate phrase, and select the matching phrase based on the scoring.

At operation 500, the system identifies a document and a query corresponding to a matching phrase in the document. In some cases, the operations of this step refer to, or may be performed by, a parser as described with reference to FIGS. 3, 4, and 6.

According to some embodiments, the input to the system is a document denoted by the sequence of the words $D=[w_1, w_2, \ldots, w_d]$ and a noun synonym denoted by the sequence of the words $Q=[w_1, w_2, \ldots, w_q]$. The system is configured to select the noun phrase $P=[w_i, w_j, \ldots, w_p]$ with the highest semantic similarity with the query Q. In some cases, the input query is a noun phrase, and the phrasal similarity network selects the phrase P among all noun phrases in document D. In an embodiment, the phrasal similarity network identifies all existing noun phrases in the given document. In some examples, a shallow parser from the SpaCy tool is used to extract all noun chunks $C=\{c_1, c_2, \ldots, c_c\}$.

According to an embodiment, the system models the task of selecting the phrase P among all candidate noun chunks C as a multi-class classification task. Hence, the number of noun chunks C is set to a pre-defined number k. Some examples set k=10. However, k can be any non-negative integer number. During training and evaluation, the phrasal similarity network includes the ground-truth noun phrase P in the k noun chunks sampled from all noun chunks C. In an embodiment, the system includes a supervised learning model for the multi-class classification task.

According to an embodiment, the input to the phrasal similarity network is the query Q and the candidate phrases $C^k$ (i.e., the k noun chunks randomly selected from C). The phrasal similarity network (or a classifier of the network) predicts one of the k classes as the output o. The ground-truth phrase P is included in $C^k$ with a random position (so that the classifier is not tied to the position of the ground-truth phrase P in the input list $C^k$ to predict the output o). The phrasal similarity network includes an input encoder. The input encoder is configured to encode the input query Q and the candidate phrases $C^k$ into high dimensional vector representations. Additionally, the classifier includes a scorer or a scoring component. Using the representation generated for the input by the input encoder and other features, the scoring component computes a score for each candidate phrase $c_i$ in $C^k$. The candidate phrase with the highest score is selected.

At operation 505, the system encodes the query and a candidate phrase. In some cases, the operations of this step refer to, or may be performed by, an encoder as described with reference to FIGS. 3, 4, and 6.

According to some embodiments, the system includes an input encoder. The input encoder is configured to encode the input query Q and the candidate phrases $C^k$ into high dimensional vector representations. Additionally, the system includes a scorer or a scoring component. Using the representation generated for the input by the input encoder and other features, the scoring component computes a score for each candidate phrase $c_i$ in $C^k$. The candidate phrase with the highest score is selected. The input encoder is also referred to as an encoder.

According to an embodiment, to encode the input query Q and the candidate phrases $C^k$, the system applies a transformer-based model (e.g., BERT). For the input query $Q=[w_1^q, w_2^q, \ldots, w_n^q]$ and each candidate phrase $c_i=[w_1^i, w_2^i, \ldots, w_m^i]$ in $C^k$, the phrasal similarity network produces the sequence $[CLS]w_1^q w_2^q \ldots w_n^q [SEP] w_1^i w_2^i \ldots w_m^i$. This sequence is input into the BERT model. Then, pair representation, query representation, and candidate representation are extracted from the last hidden layer of the BERT model. In some cases, candidate representation is also referred to as candidate phrase representation. The pair representation, query representation, and candidate representation will be described in greater detail in FIG. 6.

At operation 510, the system scores the candidate phrase using at least one learning-based score and at least one surface form score, where the at least one learning based score is based on the encoding, and the at least one surface form score is based on a surface form of the query and a surface form of the candidate phrase. In some cases, the operations of this step refer to, or may be performed by, a scoring component as described with reference to FIGS. 3, 4, and 6.

After obtaining the pair, query and candidate phrase representations, the phrasal similarity network assigns a score to each of the set of candidate phrases using a scoring component. The scoring component includes multiple types of scores. According to an embodiment, a surface form score uses the words of the query Q and the candidate phrase $c_i$ to assess the similarity between the query and the candidate score. The surface form score does not consider the meaning of the words, but rather exploits the apparent compatibility between the query and the candidate phrase. In some examples, the surface form score includes an exact match type score and a word count type score. The exact match type score and the word count type score will be described in greater detail in FIG. 6.

In an embodiment, the scoring component is configured to calculate a fixed meaning score. Despite the surface form score which computes the apparent similarity between the query and the candidate phrase, the fixed meaning score involves the meanings of the two phrases (i.e., the query and the candidate phrase) to compute their similarity. The meanings of the two phrases are obtained either from pre-trained language models or the thesaurus of synonyms. In some examples, fixed meaning scores include METEOR, fastText, and Sent2Vec. While the fixed meaning scores can incorporate meaning of the phrase into the similarity scores, since the pre-trained models are fixed (e.g., parameters of the models are fixed), they do not incorporate supervision signals for this task. In some cases, GloVe and Word2Vec models may be used to generate word embeddings or vector representations.

In an embodiment, the scoring component is configured to calculate a leaning-based score. The phrasal similarity network includes the representation vectors $p_i^r$, $q^r$ and $c_i^r$ obtained from the input encoder. As these representations are generated by the BERT encoder fine-tuned for this task, they can involve the task-specific information into the similarity scores. In some examples, the system includes a pair score and a compatibility score. Details regarding the pair score and compatibility score is provided with reference to FIG. 6. Finally, to compute one single score for the candidate $c_i$, the phrasal similarity network computes the weighted sum of all the scores mentioned above.

At operation 515, the system selects the matching phrase based on the scoring. In an embodiment, the phrasal similarity network selects the matching phrase based on the weighted sum of all the scores as described in previous steps of FIG. 5. In some cases, the operations of this step refer to, or may be performed by, a phrasal similarity network as described with reference to FIG. 3.

An apparatus for similarity search is described. The apparatus includes a processor, memory in electronic communication with the processor, and instructions stored in the memory. The instructions are operable to cause the processor to identify a document and a query corresponding to a matching phrase in the document, encode the query and a candidate phrase, score the candidate phrase using at least one learning-based score and at least one surface form score, wherein the at least one learning based score is based on the encoding, and the at least one surface form score is based on a surface form of the query and a surface form of the candidate phrase, and select the matching phrase based on the scoring.

A non-transitory computer readable medium storing code for similarity search is described. In some examples, the code comprises instructions executable by a processor to identify a document and a query corresponding to a matching phrase in the document, encode the query and a candidate phrase, score the candidate phrase using at least one learning-based score and at least one surface form score, wherein the at least one learning based score is based on the encoding, and the at least one surface form score is based on a surface form of the query and a surface form of the candidate phrase, and select the matching phrase based on the scoring.

Some examples of the method, apparatus, and non-transitory computer readable medium described above further include encoding the query and the candidate phrase together to produce a pair representation. Some examples further include decoding the pair representation to produce a pair score, wherein the at least one learning-based score comprises the pair score.

Some examples of the method, apparatus, and non-transitory computer readable medium described above further include encoding the query and the candidate phrase together to produce a pair representation. Some examples further include encoding the query and the candidate phrase separately to produce a query representation and a candidate representation. Some examples further include computing a compatibility score based on the pair representation, the query representation, and the candidate representation, wherein the at least one learning-based score comprises the compatibility score.

Some examples of the method, apparatus, and non-transitory computer readable medium described above further include computing a first product of the query representation and the pair representation. Some examples further include computing a second product of the candidate representation and the pair representation. Some examples further include summing the first product and the second product to produce the compatibility score.

Some examples of the method, apparatus, and non-transitory computer readable medium described above further include determining a number of matching words the query has in common with the candidate phrase. Some examples further include computing a word match score based on the number of matching words, wherein the at least one surface form score comprises the word match score.

Some examples of the method, apparatus, and non-transitory computer readable medium described above further include determining a minimum number of words in the query and the candidate phrase. Some examples further include dividing the number of matching words by the minimum number to produce the word match score.

Some examples of the method, apparatus, and non-transitory computer readable medium described above further include determining a number of words in the query. Some examples further include determining a number of words in the candidate phrase. Some examples further include computing a word count score based on a difference between the number of words in the query and the number of words in the candidate phrase, wherein the at least one surface form score comprises the word count score.

Some examples of the method, apparatus, and non-transitory computer readable medium described above further include computing a harmonic similarity score based on a harmonic mean of a precision and a recall between fixed semantic representations of the query and the candidate phrase, wherein the scoring is further based on the harmonic similarity score.

Some examples of the method, apparatus, and non-transitory computer readable medium described above further include computing a cosine similarity score based on a cosine similarity between fixed semantic representations of the query and the candidate phrase, wherein the scoring is further based on the cosine similarity score.

In some examples, the at least one learning-based score represents semantic similarity between the query and the candidate phrase, and the at least one surface form score does not represent semantic similarity between the query and the candidate phrase.

Some examples of the method, apparatus, and non-transitory computer readable medium described above further include identifying a relationship between the query and the candidate phrase based on the selecting. Some examples further include updating a knowledge based on the relationship.

Some examples of the method, apparatus, and non-transitory computer readable medium described above further include receiving the query from a user. Some examples further include identifying information from the document based on selecting the matching phrase. Some examples further include responding to the query using the identified information.

Some examples of the method, apparatus, and non-transitory computer readable medium described above further include identifying a plurality of candidate phrases from the document. Some examples further include scoring each of the candidate phrases. Some examples further include determining that the candidate phrase has a highest score among the candidate phrases, wherein the candidate phrase is selected as the matching phrase based on the determination.

Figure 6:
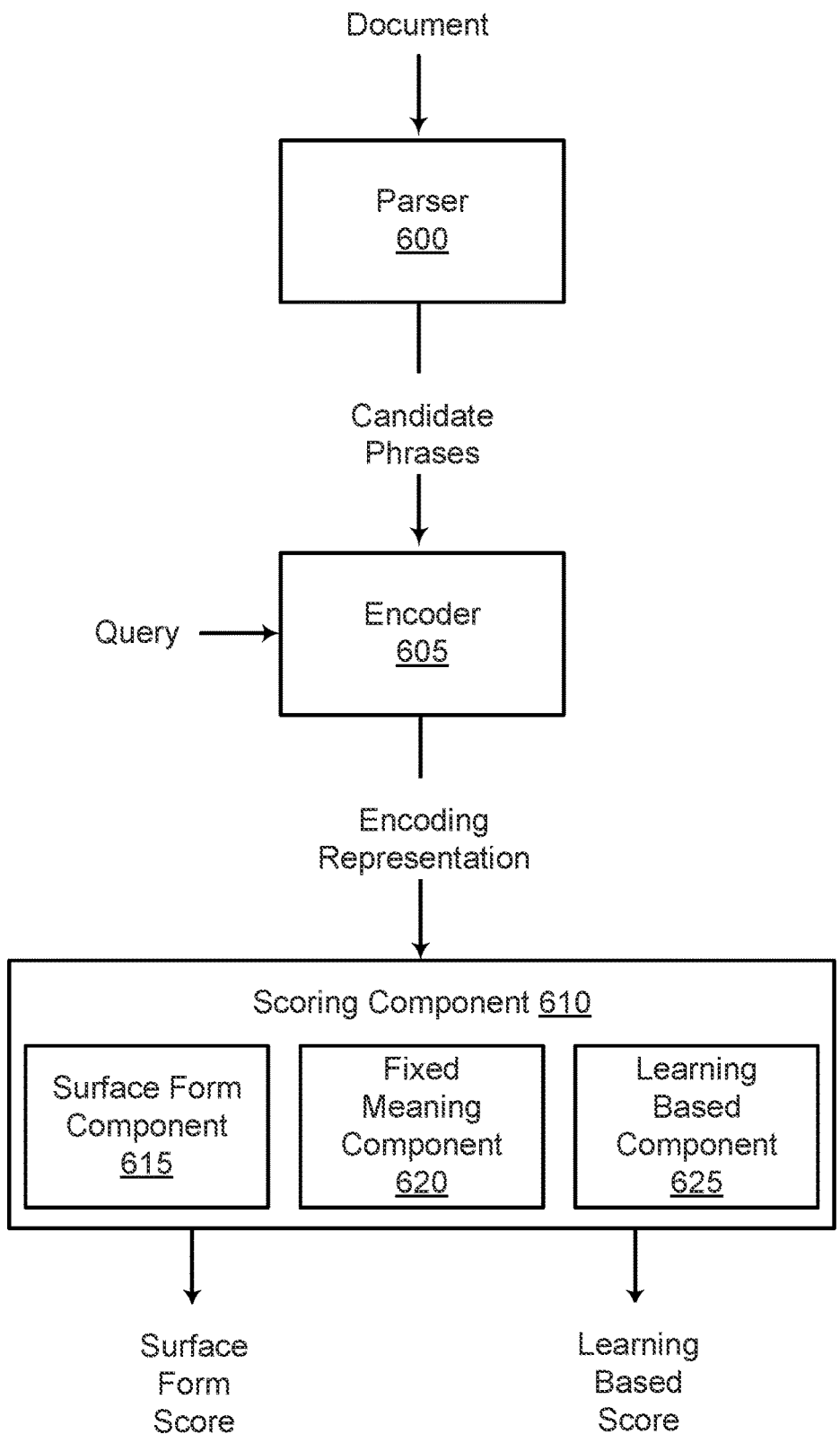

FIG. 6 shows an example of a phrasal similarity process according to aspects of the present disclosure. The example shown includes parser 600, encoder 605, and scoring component 610.

From top to the bottom of FIG. 6, a document is input to a parser 600 to produce a set of candidate phrases. Parser 600 is configured to identify a type of phrases in a given document. In some examples, the phrases are noun phrases and parser 600 is a shallow parser (e.g., SpaCy tool is used to extract all noun chunks from a document). Parser 600 extracts all the noun phrases in the document. In some cases, the noun phrases are referred to as the set of candidate phrases. Parser 600 is an example of, or includes aspects of, the corresponding element described with reference to FIGS. 3 and 4.

In an embodiment, encoder 605 includes a transformer-based BERT model. Pair representation, query representation and candidate representation are extracted from the last hidden layer of the BERT model. In an embodiment, a query and the set of candidate phrases are input to encoder 605, which produces encoding representation (i.e., pair representation, query representation and candidate representation). Encoder 605 is an example of, or includes aspects of, the corresponding element described with reference to FIGS. 3 and 4.

A pair representation is extracted from encoder 605. In an embodiment, the network uses the representation of [CLS] as the pair representation, i.e., $p_i^r$. This vector encodes information about both the input query Q and the candidate phrase $c_i$.

A query representation is extracted from encoder 605. In one embodiment, the phrasal similarity network uses the max pooling over the vector representations of the words in the sequence $w_1^q w_2^q \ldots w_n^q$ to represent the query. As an example, the d-th dimension of the query representation $q^r$ is computed by:

$$q_d^r = \max_{j \in \{1 \ldots q\}} h_{d,j}^q \quad (1)$$

where $q_d^r$ is the d-th dimension of the query representation $q^r$ and $h_{d,j}^q$ is the d-th dimension of the vector representation of the j-th word in the sequence $w_1^q w_2^q \ldots w_n^q$ obtained from the BERT encoder.

A candidate representation is extracted from encoder 605. Similar to the query representation, the phrasal similarity network uses the vectors generated by BERT model for each word in the sequence $w_1^i w_2^i \ldots w_m^i$ to represent the candidate $c_i$. For example, the d-th dimension of the candidate representation $c_i^r$ is computed as follows:

$$c_{d,i}^r = \max_{j \in \{1 \ldots q\}} h_{d,j}^i \quad (2)$$

where $c_{d,i}^r$ is the d-th dimension of the candidate representation $c_i^r$ and $h_{d,j}^i$ is the d-th dimension of the vector representation of the j-th word in the sequence $w_1^i w_2^i \ldots w_m^i$ obtained from the BERT encoder.

The encoding representation (i.e., pair representation, query representation and candidate representation) is input to a scoring component 610 to generate a surface form score and a learning-based score. In one embodiment, scoring component 610 includes surface form component 615, fixed meaning component 620, and learning based component 625. The scoring component 610 is an example of, or includes aspects of, the corresponding element described with reference to FIGS. 3 and 4. The three representations $p_i^r$, $q^r$ and $c_i^r$ is input to the scoring component 610 to compute the scores for the i-th candidate phrase $c_i$.

Surface form component 615 is configured to compute surface form scores including an exact match type score and a word count type score. Surface form component 615 is an example of, or includes aspects of, the corresponding element described with reference to FIG. 4. In an embodiment, the exact match type score computes the number of words that are in common between the query Q and the candidate phrase $c_i$, normalized with the minimum of the length of the query Q and the candidate phrase $c_i$:

$$S_1^i = \frac{|\{w_1^q, w_2^q, \ldots, w_n^q\} \cap \{w_1^i, w_2^i, \ldots, w_m^i\}|}{\min(|\{w_1^q, w_2^q, \ldots, w_n^q\}|, |\{w_1^i, w_2^i, \ldots, w_m^i\}|)} \quad (3)$$

Note that {•} denotes the set of the words, entailing that each common word between the query and the candidate phrase is counted only once. |•| denotes the set size.

The word count type score computes the difference between the number of words in the query Q and the candidate phrase $c_i$ as the following:

$$S_2^i = |[w_1^q, w_2^q, \ldots, w_n^q]| - |[w_1^i, w_2^i, \ldots, w_m^i]| \quad (4)$$

In an embodiment, the scoring component (i.e., a fixed meaning component 620 thereof) is configured to calculate a fixed meaning score. In some examples, the fixed meaning score include METEOR, fastText, and Sent2Vec type score/metric. Fixed meaning component 620 is an example of, or includes aspects of, the corresponding element described with reference to FIG. 4.

The METEOR metric has been used for evaluating machine translation systems. It computes the harmonic mean of the precision and recall of matches between the two phrase (i.e., they query q and the candidate phrase $c_i$). The word $w_j^i$ of the candidate phrase $c_i$ is counted as a match if (A) there is an exact match between this word and the word $w_l^q$ in the query Q, (B) there is a word $w_l^q$ in the query Q with the same stem as the word $w_j^i$, (C) there is a word $w_l^q$ in the query Q which is the synonym of the word $w_j^i$. The score obtained for this metric is denoted by $S_3^i$.

The fastText metric is a tool for neural network based language models that are pre-trained. Mean pooling over the embeddings of the words is employed to represent the query Q and the candidate phrase $c_i$. Afterwards, the cosine similarity between the query and the candidate representations are used as the score of the candidate $c_i$, i.e., $S_4^i$.

The Sent2Vec metric is an unsupervised pre-trained language model which represents the sentences using the average of the embeddings of the words of the sentence. To obtain the Sent2Vec scores, the network generates the embeddings of the query Q and the candidate phrase $c_i$. Afterwards, the cosine similarity between the two vectors is used as the similarity score for the candidate $c_i$, i.e., $S_5^i$. In some examples, a GloVe or Word2Vec model may be used to generate word embeddings or vector representations.

In an embodiment, the scoring component is configured to calculate a leaning-based score using a learning based component 625. In some examples, the learning based component 625 is configured to produce a pair score and a compatibility score. The pair score is computed from the pair representation $p_i^r$. For example, the pair representation $p_i^r$ is input to a two layer feed forward neural net:

$$S_6^i = W_2*(W_1*p_i^r + b_1) + b_2 \quad (5)$$

where $W_1$, $W_2$, $b_1$ and $b_2$ are trainable parameters.

The compatibility score computes the similarity between the pair representation $p_i^r$ with the query and the candidate phrase representations $q^r$ and $c_i^r$. The intuition behind this score is that if the query and the candidate phrase are a match, their representations are more similar to the pair representation than the case that they are not a match. The network computes the following score:

$$S_7^i = q^r \odot p^r + c_i^r \odot p^r \quad (6)$$

where $\odot$ is the Hadamard product. Learning based component 625 is an example of, or includes aspects of, the corresponding element described with reference to FIG. 4.

Finally, the network computes the weighted sum of all aforementioned scores to compute one single score for the candidate $c_i$ as follows:

$$S^i = \sum_{j=1...7} \alpha_j S_j^i \quad (7)$$

where $\alpha_j$ is a trainable weight. To compute the probability distribution for all candidate phrases in $C^k$, the network computes the softmax of the candidate scores:

$$\mathcal{F} = \text{softmax}(S^1, S^2, \ldots, S^k) \quad (8)$$

The softmax function is used as the activation function of the neural network to normalize the output of the network to a probability distribution over predicted output classes. After applying the softmax function, each component of the feature map is in the interval (0, 1) and the components add up to one. These values are interpreted as probabilities.

Training and Evaluation

Figure 7:
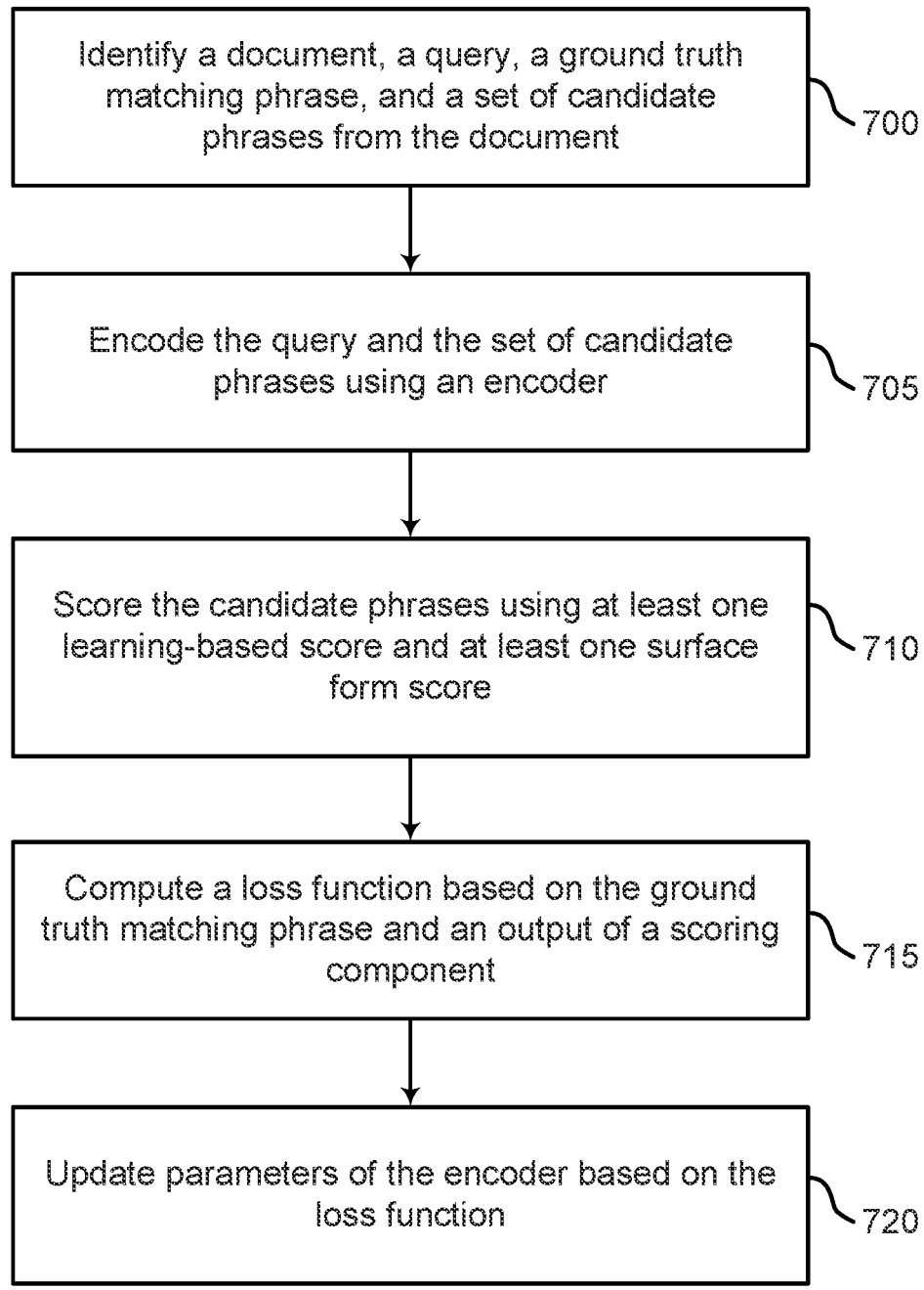
FIG. 7 shows an example of a process for training a phrasal similarity network according to aspects of the present disclosure.

FIG. 7 shows an example of a process for training a phrasal similarity network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for training a machine learning model is described. Embodiments of the method are configured to identify a document, a query, a ground truth matching phrase, and a plurality of candidate phrases from the document, encode the query and the plurality of candidate phrases using an encoder, score the candidate phrases using at least one learning-based score and at least one surface form score, wherein the at least one learning based score is based on the encoding, and the at least one surface form score is based on a surface form of the query and a surface form of a candidate phrase of the plurality of candidate phrases, compute a loss function based on the ground truth matching phrase and an output of a scoring component, and update parameters of the encoder based on the loss function.

Accordingly, the parameters and weights of a phrasal similarity apparatus are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 700, the system identifies a document, a query, a ground truth matching phrase, and a set of candidate phrases from the document. In some examples, the query is a noun phrase. Additionally, the set of candidate phrases include all the noun phrases appearing in the document. In an embodiment, a parser is used to identify and extract the set of candidate phrases from the document. In some cases, the operations of this step refer to, or may be performed by, a training component as described with reference to FIG. 3.

At operation 705, the system encodes the query and the set of candidate phrases using an encoder. In an embodiment, the query and the set of candidate phrases are input to an encoder (e.g., transformer-based model BERT). As an example, input query and each candidate phrase in the set of candidate phrases, and special tokens [CLS] and [SEP] are combined into a sequence. The sequence is then input to the BERT model. Encoding or encoding representations are extracted from the last hidden layer of the BERT model. In an embodiment, the encoding representations include pair representation, query representation, and candidate representation. These representations are input to a scoring component of the phrasal similarity network. In some cases, the operations of this step refer to, or may be performed by, an encoder as described with reference to FIGS. 3, 4, and 6.

At operation 710, the system scores the candidate phrases using at least one learning-based score and at least one surface form score, where the at least one learning based score is based on the encoding, and the at least one surface form score is based on a surface form of the query and a surface form of a candidate phrase of the set of candidate phrases. In some cases, the operations of this step refer to, or may be performed by, a scoring component as described with reference to FIGS. 3, 4, and 6.

After obtaining the pair, query and candidate phrase representations, the system assigns a score to each candidate phrase of the set of candidate phrases. According to an embodiment, the scoring component computes a surface form score, which depends on the words of the query Q and the candidate phrase $c_i$ to assess the similarity between the query and the candidate score. The surface form score makes use of the apparent compatibility between the query and the candidate phrase. In an embodiment, an exact match type score computes the number of words that are in common between the query and the candidate phrase normalized with the minimum of the length of the query and the candidate phrase. In another embodiment, a word count type score computes the difference between the number of words in the query and the candidate phrase.

According to an embodiment, the scoring component also computes a learning-based score, which incorporates supervision signals for the specific task and involves the task-specific information into the similarity scores (because representation vectors $p_i^r$, $q^r$ and $c_i^r$ obtained from the input encoder are generated by the BERT encoder fine-tuned for the task). A pair score is computed based on the pair representation. Additionally, a compatibility score measures the similarity between the pair representation with the query and the candidate phrase representations.

At operation 715, the system computes a loss function based on the ground truth matching phrase and an output of a scoring component. In some cases, the operations of this step refer to, or may be performed by, a training component as described with reference to FIG. 3.

In some examples, a supervised training model may be used that includes a loss function that compares predictions of the network with ground truth training data. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are mode during the next iteration.

To train the input encoder and the weights $\alpha_j$, the phrasal similarity network uses a loss function as follows:

$$\mathcal{L} = -\log \mathcal{F}_t \quad (9)$$

where t is the index of the ground truth phrase among all candidate phrase $C^k$. In evaluation phase, the candidate phrase with the highest probability in $\mathcal{F}$ is selected as the model prediction. The ground truth matching phrase provides information regarding a correct matching phrase given a query. In some examples, the loss function may include a cross entropy loss.

At operation 720, the system updates parameters of the encoder based on the loss function. In some examples, at training, parameters of the BERT encoder are updated, the phrasal similarity network can learn the task-specific features and encode them in the representations including pair representation $p_i^r$, query representation $q^r$ and candidate representation $c_i^r$. In some cases, the operations of this step refer to, or may be performed by, a training component as described with reference to FIG. 3.

An apparatus for training a machine learning model is described. The apparatus includes a processor, memory in electronic communication with the processor, and instructions stored in the memory. The instructions are operable to cause the processor to identify a document, a query, a ground truth matching phrase, and a plurality of candidate phrases from the document, encode the query and the plurality of candidate phrases using an encoder, score the candidate phrases using at least one learning-based score and at least one surface form score, wherein the at least one learning based score is based on the encoding, and the at least one surface form score is based on a surface form of the query and a surface form of a candidate phrase of the plurality of candidate phrases, compute a loss function based on the ground truth matching phrase and an output of a scoring component, and update parameters of the encoder based on the loss function.

A non-transitory computer readable medium storing code for training a machine learning model is described. In some examples, the code comprises instructions executable by a processor to identify a document, a query, a ground truth matching phrase, and a plurality of candidate phrases from the document, encode the query and the plurality of candidate phrases using an encoder, score the candidate phrases using at least one learning-based score and at least one surface form score, wherein the at least one learning based score is based on the encoding, and the at least one surface form score is based on a surface form of the query and a surface form of a candidate phrase of the plurality of candidate phrases, compute a loss function based on the ground truth matching phrase and an output of a scoring component, and update parameters of the encoder based on the loss function.

In some examples, the output of the scoring component comprises a probability distribution for the plurality of candidate phrases, and the loss function comprises a negative log likelihood of a component of the probability distribution corresponding to the ground truth matching phrase.

Performance of apparatus and methods of the present disclosure have been evaluated, and results indicate embodiments of the present disclosure provide an improvement over existing technology. The phrasal similarity network is compared to baseline systems as described below. First, the network is compared to the BERT model. In an embodiment, the parameters of the pre-trained language model BERT are fixed and the input to the BERT model to represent the query is $[CLS]w_1^q w_2^q \ldots w_n^q[SEP]$ and the input to represent the candidate phrase $c_i$ is $[CLS]w_1^i w_2^i \ldots w_m^i[SEP]$. The cosine similarity between the query and the candidate phrase representations are used as the candidate score. The candidate with the highest score is used as the model prediction.

Second, the network is compared to BERTScore. The BERTScore model is used to compute the similarity between two sentences using the BERT embedding of their words. The phrasal similarity network uses the pre-trained BERTScore model to compute the similarity score between the query and the candidate phrase. The candidate with the highest score is used as the model prediction.

Third, the network is compared to METEOR model. Similar to score $S_3^i$, the network uses the METEOR similarity score between the query and the candidate phrase as the score of the candidate. The candidate with the highest score is used as the model prediction.

Fourth, the network is compared to fastText model. The fastText model uses the same score as $S_4^i$ to compute the similarity between the candidate phrase and the query. The candidate with the highest score is selected as the model prediction.

Fifth, the network is compared to Sent2Vec model. The Sent2Vec model uses the score $S_5^i$ as the candidate score and the candidate with the highest score is selected as the model prediction. The comparison on the test set is evaluated and recorded. In some examples, the network achieves 96.7% accuracy on test set, and significantly outperforms the existing models.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for similarity search, comprising:
identifying a document and a query requesting information in the document;
encoding the query and a candidate phrase from the document to obtain a query representation corresponding to the query, a candidate representation corresponding to the candidate phrase, and a pair representation comprising a vector encoding information from both the query and the candidate phrase;
scoring the candidate phrase using at least one learning-based score, wherein the at least one learning-based score is based on a first vector similarity between the pair representation and the candidate representation and a second vector similarity between the pair representation and the query representation;
selecting the candidate phrase as a matching phrase based on the at least one learning-based score; and
transmitting a response to the query based on the matching phrase.

2. The method of claim 1, further comprising:
decoding the pair representation to produce a pair score, wherein the at least one learning-based score comprises the pair score.

3. The method of claim 1, further comprising:
determining a number of words in the query;
determining a number of words in the candidate phrase; and
computing a word count score based on a difference between the number of words in the query and the number of words in the candidate phrase, wherein an at least one surface form score comprises the word count score.

4. The method of claim 1, further comprising:
computing a harmonic similarity score based on a harmonic mean of a precision and a recall between fixed semantic representations of the query and the candidate phrase, wherein the scoring is further based on the harmonic similarity score.

5. The method of claim 1, further comprising:
computing a cosine similarity score based on a cosine similarity between fixed semantic representations of the query and the candidate phrase, wherein the scoring is further based on the cosine similarity score.

6. The method of claim 1, wherein:
the at least one learning-based score represents semantic similarity between the query and the candidate phrase, and an at least one surface form score does not represent semantic similarity between the query and the candidate phrase.

7. The method of claim 1, further comprising:
identifying a relationship between the query and the candidate phrase based on the selecting; and
updating a knowledge based on the relationship.

8. The method of claim 1, further comprising:
receiving the query from a user;
identifying information from the document based on selecting the matching phrase; and
responding to the query using the identified information.

9. The method of claim 1, further comprising:
identifying a plurality of candidate phrases from the document;
scoring each of the candidate phrases; and
determining that the candidate phrase has a highest score among the candidate phrases, wherein the candidate phrase is selected as the matching phrase based on the determination.

10. The method of claim 1, further comprising:
scoring the candidate phrase using at least one surface form score, wherein the at least one surface form score is based on a surface form of the query and a surface form of the candidate phrase.

11. The method of claim 1, further comprising:
computing a compatibility score based on the pair representation, the query representation, and the candidate representation, wherein the at least one learning-based score comprises the compatibility score.

12. The method of claim 11, further comprising:
computing a first product of the query representation and the pair representation;
computing a second product of the candidate representation and the pair representation; and
summing the first product and the second product to produce the compatibility score.

13. The method of claim 1, further comprising:
determining a number of matching words the query has in common with the candidate phrase; and
computing a word match score based on the number of matching words, wherein an at least one surface form score comprises the word match score.

14. The method of claim 13, further comprising:
determining a minimum number of words in the query and the candidate phrase; and
dividing the number of matching words by the minimum number to produce the word match score.

15. An apparatus for similarity search, comprising:
an encoder configured to encode a query and a candidate phrase from a document to obtain a query representation corresponding to the query, a candidate representation corresponding to the candidate phrase, and a pair representation corresponding to both the query and the candidate phrase, wherein the query representation, the candidate representation, and the pair representation are vectors located in a same embedding vector space; and
a scoring component configured to score the candidate phrase using at least one learning-based score, wherein the at least one learning-based score is based on the query representation, the candidate representation, and the pair representation.

16. The apparatus of claim 15, further comprising:
a parser configured to identify a plurality of candidate phrases from the document.

17. The apparatus of claim 15, further comprising:
a user interface configured to receive the query from a user and present a response to the user based on an output of the scoring component.

18. The apparatus of claim 15, wherein:
the encoder comprises a supervised machine learning model that is trainable based on an output of the scoring component.

19. A method for training a machine learning model, comprising:
- identifying a document, a query, a ground truth matching phrase, and a plurality of candidate phrases from the document;
- encoding the query and the plurality of candidate phrases using an encoder to obtain a query representation corresponding to the query, a candidate representation corresponding to a candidate phrase of the plurality of candidate phrases, and a pair representation corresponding to both the query and the candidate phrase, wherein the query representation, the candidate representation, and the pair representation are located in a same embedding space;
- scoring the candidate phrases using at least one learning-based score, wherein the at least one learning-based score is based on the query representation, the candidate representation, and the pair representation;
- computing a loss function based on the ground truth matching phrase and an output of a scoring component; and
- updating parameters of the encoder based on the loss function.

20. The method of claim 19, wherein:
the output of the scoring component comprises a probability distribution for the plurality of candidate phrases, and the loss function comprises a negative log likelihood of a component of the probability distribution corresponding to the ground truth matching phrase.

* * * * *